Jan. 3, 1933. C. C. McCAIN 1,893,463
EMBOSSING MACHINE
Filed July 10, 1929 12 Sheets-Sheet 2

Inventor:
Cecil C. McCain,
By Wm. O. Belt atty.

Jan. 3, 1933. C. C. McCAIN 1,893,463
EMBOSSING MACHINE
Filed July 10, 1929 12 Sheets-Sheet 4

Inventor:
Cecil C. McCain,
By Wm. O. Belt, atty.

Jan. 3, 1933.    C. C. McCAIN    1,893,463
EMBOSSING MACHINE
Filed July 10, 1929    12 Sheets-Sheet 5
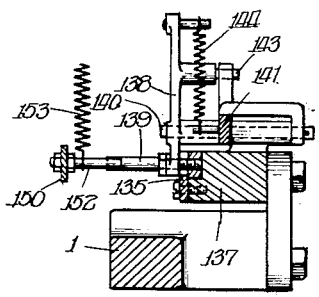
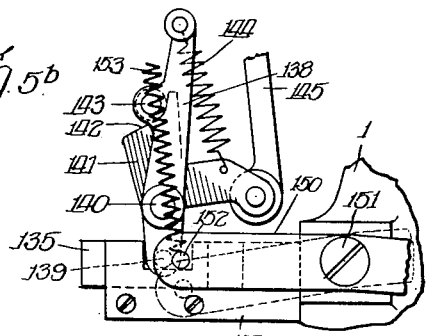
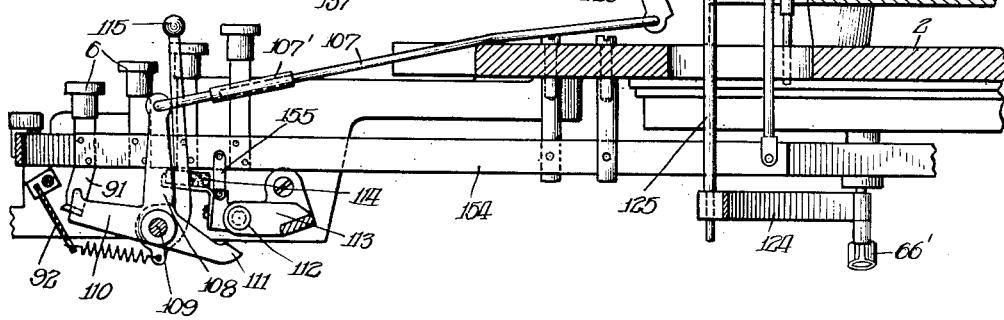
Inventor
Cecil C. McCain,
By Wm. O. Belt atty.

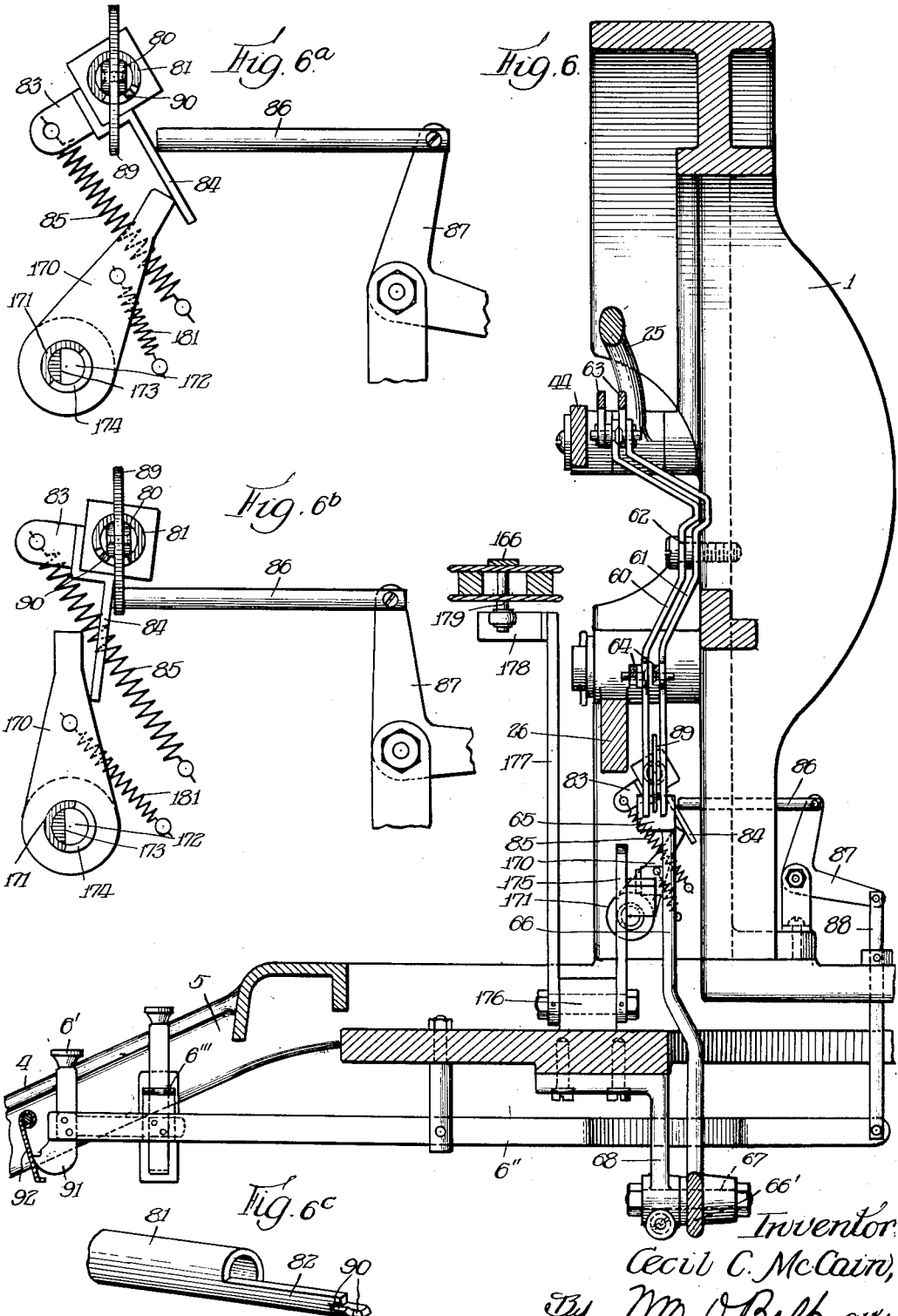

Jan. 3, 1933. C. C. McCAIN 1,893,463
EMBOSSING MACHINE
Filed July 10, 1929 12 Sheets-Sheet 7
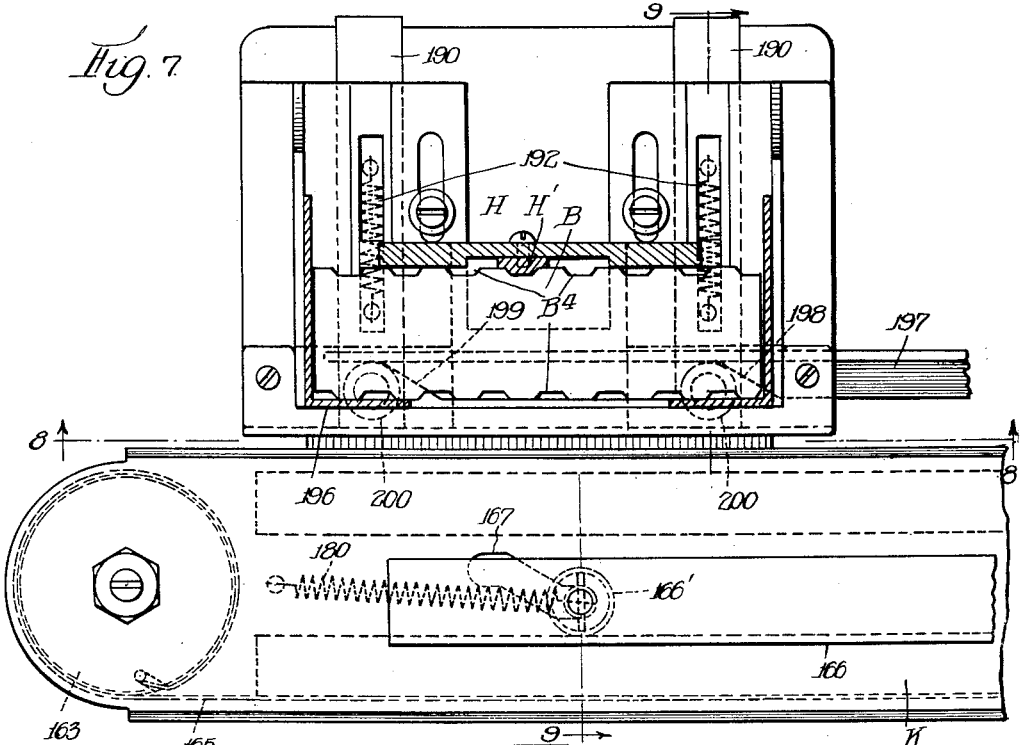
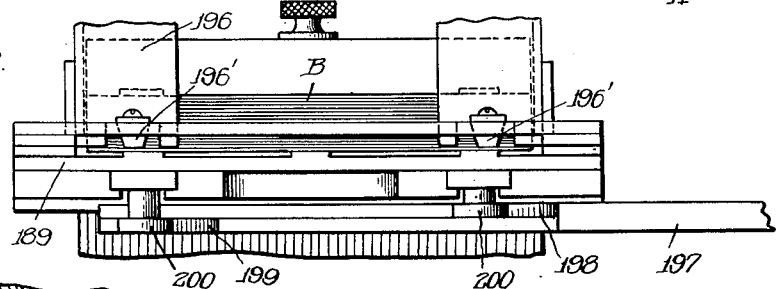
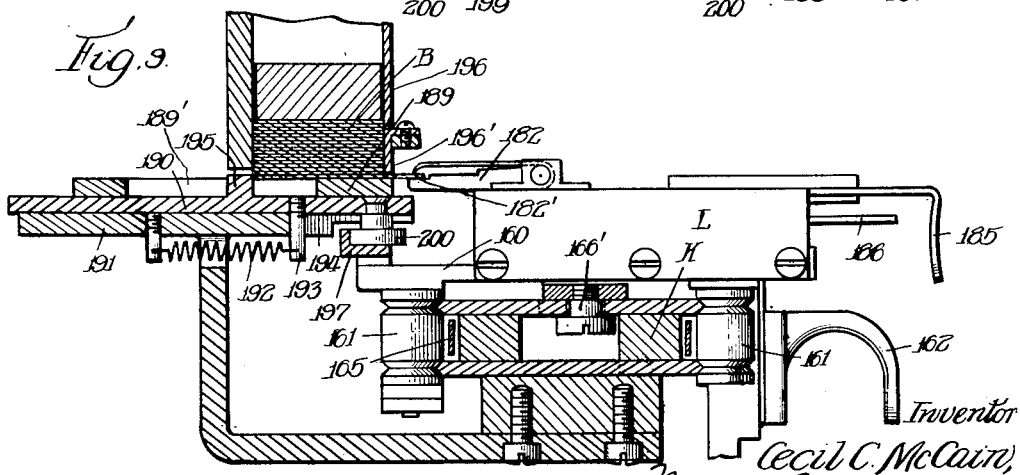
Inventor
Cecil C. McCain
By M. O. Bell atty.

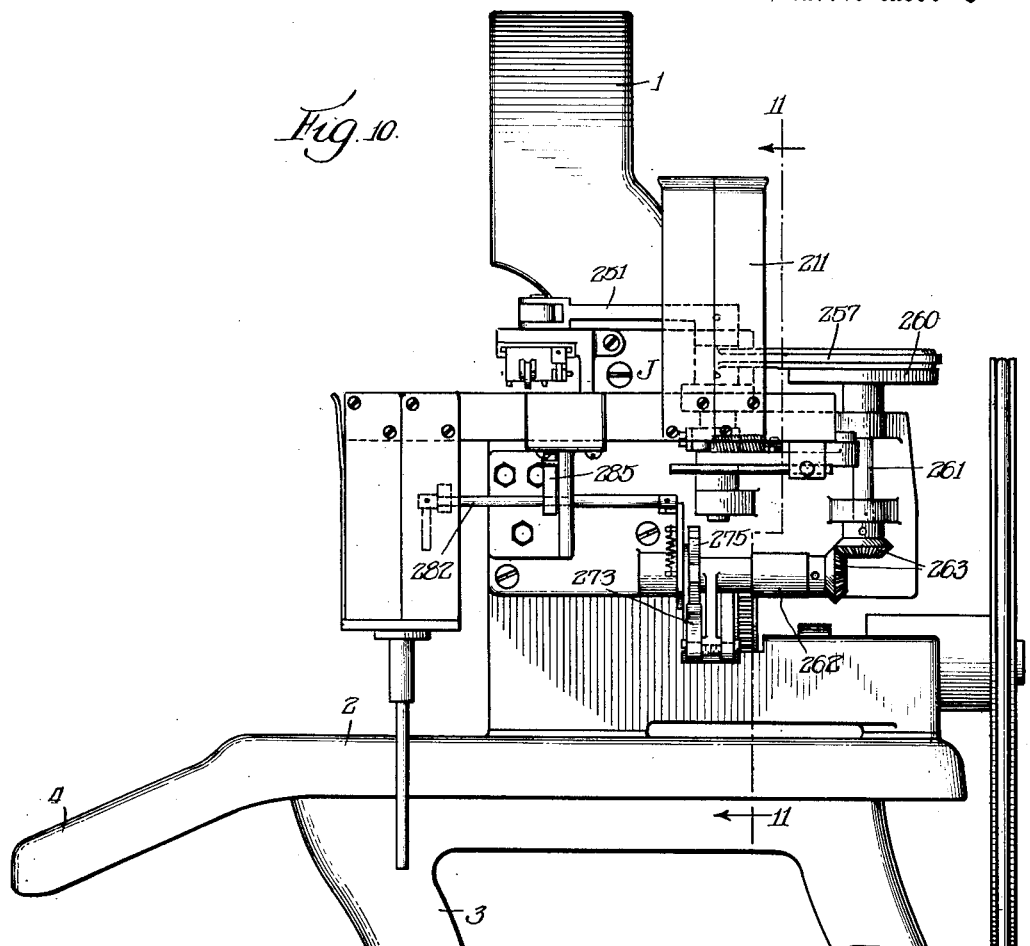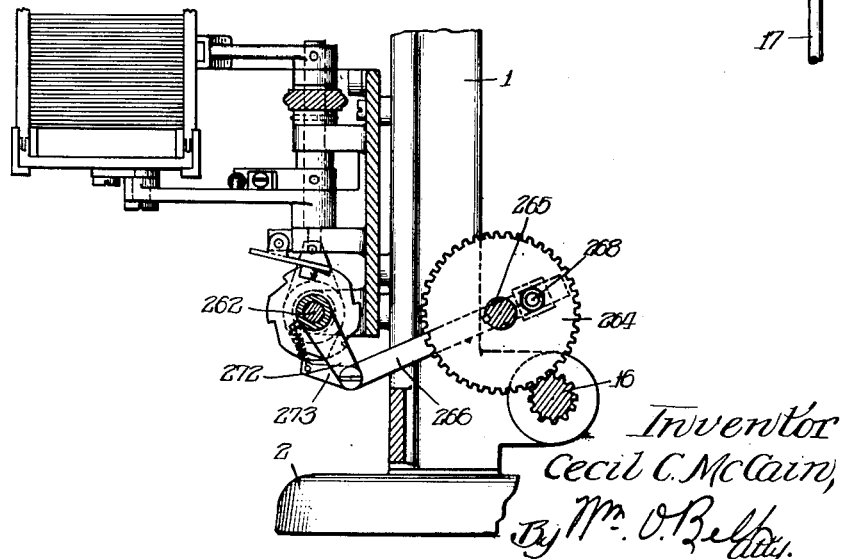

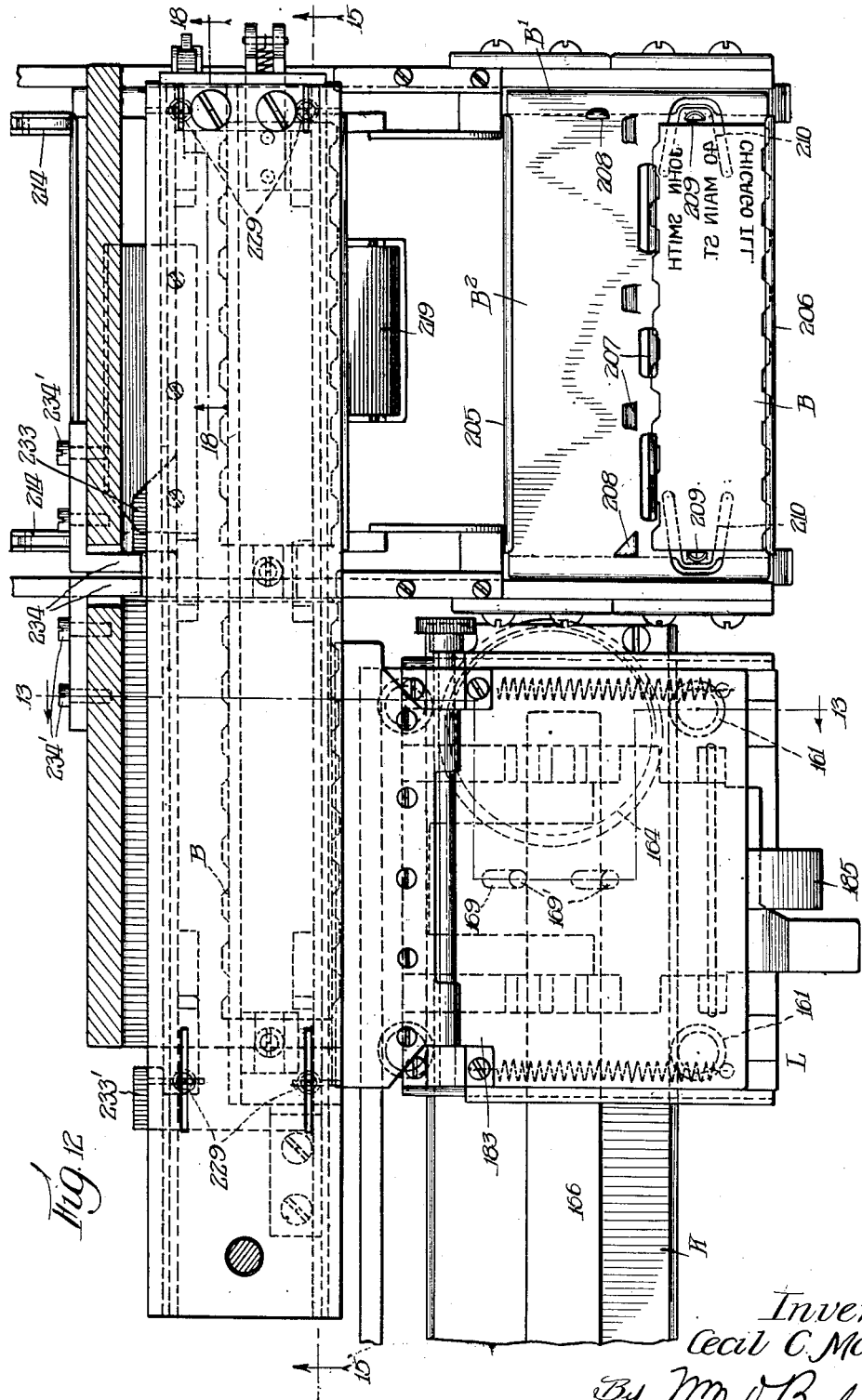

Jan. 3, 1933.  C. C. McCAIN  1,893,463
EMBOSSING MACHINE
Filed July 10, 1929   12 Sheets-Sheet 10
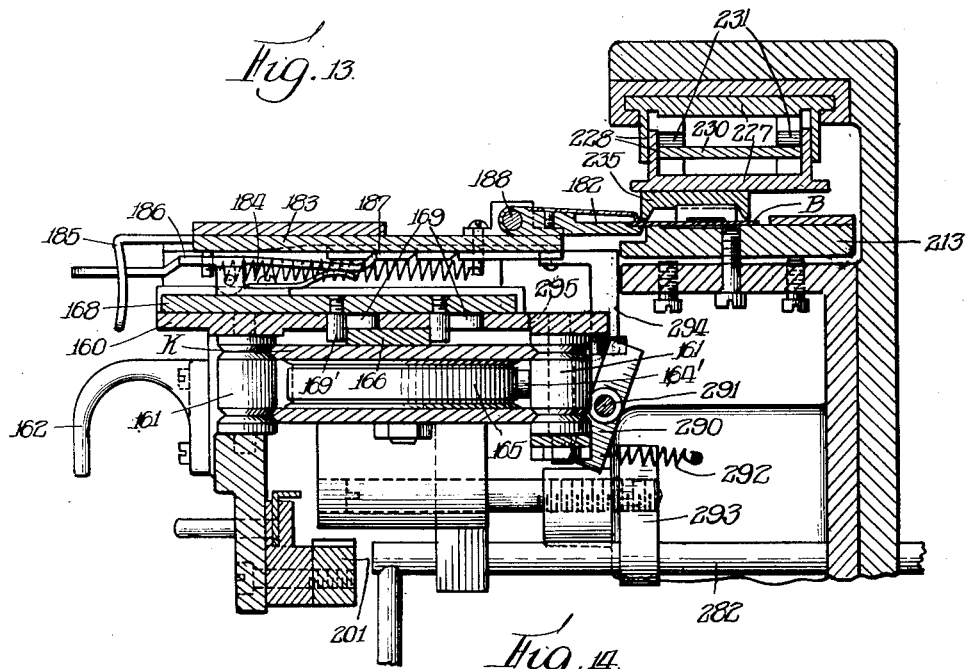
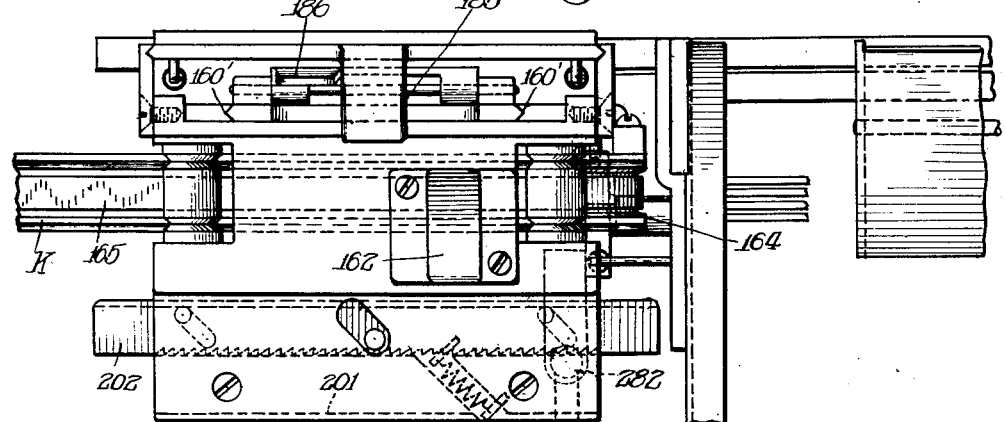
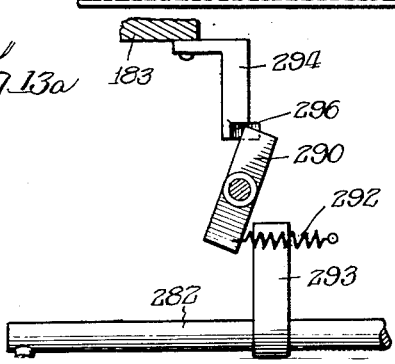
Inventor:-
Cecil C. McCain,
By Wm. O. Belt atty.

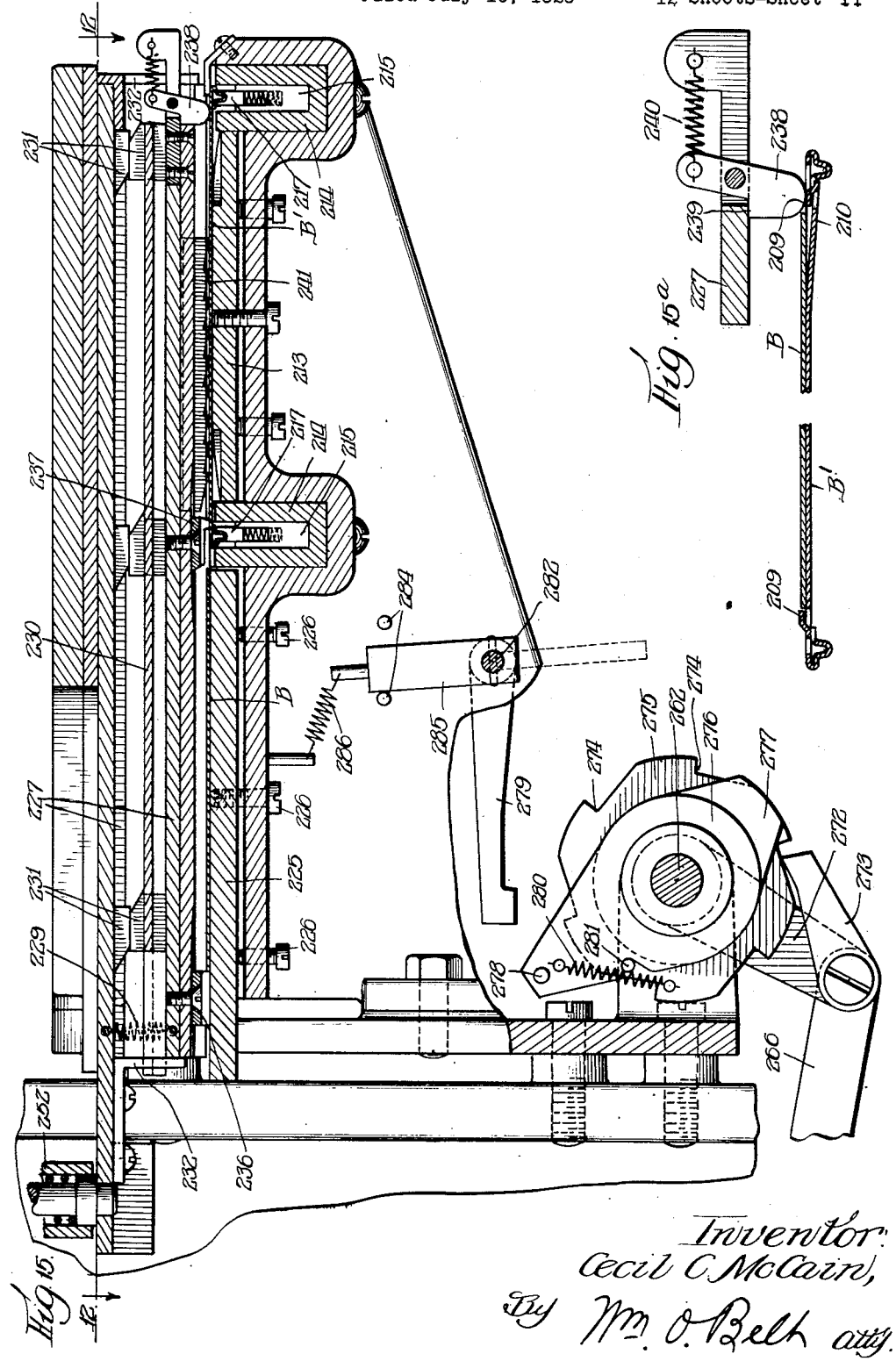

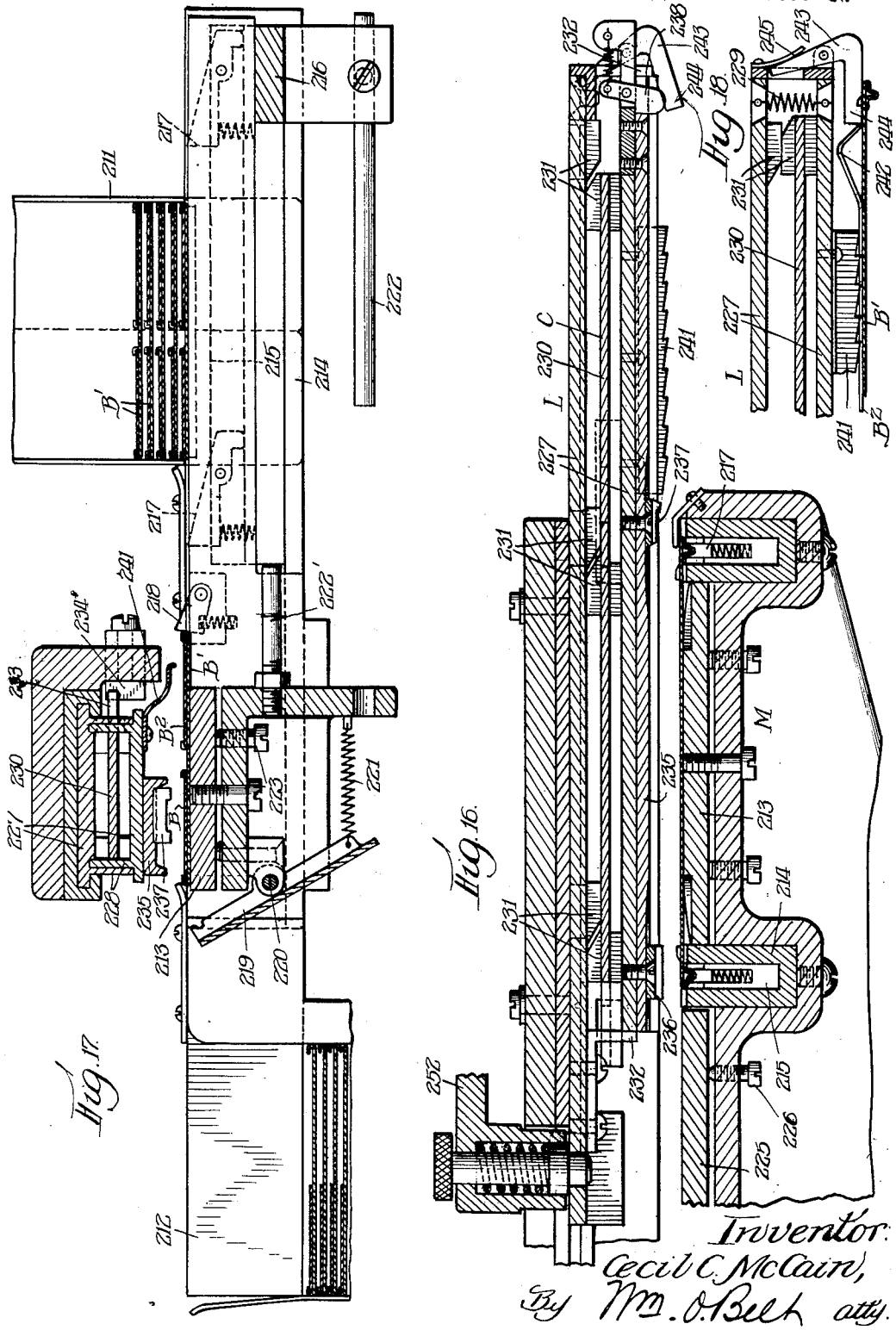

Patented Jan. 3, 1933

1,893,463

UNITED STATES PATENT OFFICE

CECIL C. McCAIN, OF GLEN ELLYN, ILLINOIS, ASSIGNOR TO ADDRESSOGRAPH COMPANY, OF WILMINGTON, DELAWARE, A CORPORATION OF DELAWARE

EMBOSSING MACHINE

Application filed July 10, 1929. Serial No. 377,248.

My invention relates to improvements in embossing machines for embossing letters or characters on printing or addressing plates for individual printing devices.

One of the principal objects of the invention is to provide an improved machine of this character which will emboss printing plate blanks and automatically insert the embossed plates in the frames of the individual printing devices.

Another object is to provide a machine which will automatically remove printing plates from printing device frames and insert newly embossed plates in said frames in the place of the removed plates.

A further object is to provide a machine which will automatically remove both the information cards and printing plates from the frames and simultaneously insert a new printing plate in the place of the removed plate.

A further object is to provide an improved embossing machine which will stamp both upper and lower case printing characters on the printing plates and which will automatically shift the printing plate to receive whichever characters are to be embossed on the plate.

A further object is to provide a printing plate embossing machine having a rotatable die carrying head which will be normally idle or non-rotating during the intervals between the operations of the keys and which will be released for rotation in response to the operation of the keys for positioning the dies corresponding to the operated keys.

A further object is to provide an embossing machine in which the supply of printing plate blanks are contained in a magazine, and are automatically withdrawn from said magazine and mounted on a carriage ready for the embossing operations.

Other objects of my invention will appear hereinafter.

Fig. 2a is a detail section of the safety connection between the power shaft and the mechanism;

Fig. 5 is a detail section on the staggered line 5—5 of Fig. 3;

Fig. 5a is a detail vertical section on the line 5a—5a of Fig. 3;

Fig. 5b is an enlarged detail of the die carrier holding mechanism shown in Fig. 5a;

Fig. 6 is a vertical section of the staggered line 6—6 of Fig. 3;

Figs. 6a and 6b are enlarged details of the key operated parts of the case shifting mechanism;

Fig. 6c is a detail perspective of the case shift locking key;

Fig. 7 is an enlarged plan view of the left hand end of the plate carriage guide frame and the magazine for holding the stack of printing plate blanks, showing the feed mechanism for transferring the blanks from the magazine to the plate carriage;

Fig. 8 is a detail vertical section on the line 8—8 of Fig. 7;

Fig. 9 is a transverse detail vertical section on the line 9—9 of Fig. 7;

Fig. 10 is a view in elevation of the right hand side of the machine showing the driving mechanism for the plate ejecting and inserting mechanism;

Fig. 11 is a vertical detail section on the line 11—11 of Fig. 10;

Fig. 12 is an enlarged plan view, with the top portion of the guide in section, of the printing plate ejecting and inserting mechanism, with the plate carriage at the right hand side of the machine in position to discharge an embossed printing plate, the view being taken on the line 12—12 of Fig. 15;

Fig. 13 is a transverse vertical section on the staggered line 13—13 of Fig. 12;

Fig. 13a is a detail of the parts for insuring the proper position of the embossed plate on the ejector bed.

Fig. 14 is a front view in elevation of the plate carriage in the position it occupies in Fig. 12;

Fig. 15 is a vertical section on the line 15—15 of Fig. 12;

Fig. 15a is a detail of the device for releasing a printing plate from a printing device frame preparatory to being ejected from the frame;

Fig. 16 is an enlarged vertical section on the line 16—16 of Fig. 2;

Fig. 17 is an enlarged vertical section on the staggered line 17—17 of Fig. 2; and Fig. 18 is an enlarged detail section of the information card crimping device on the line 18—18 of Fig. 12.

Figure 1:
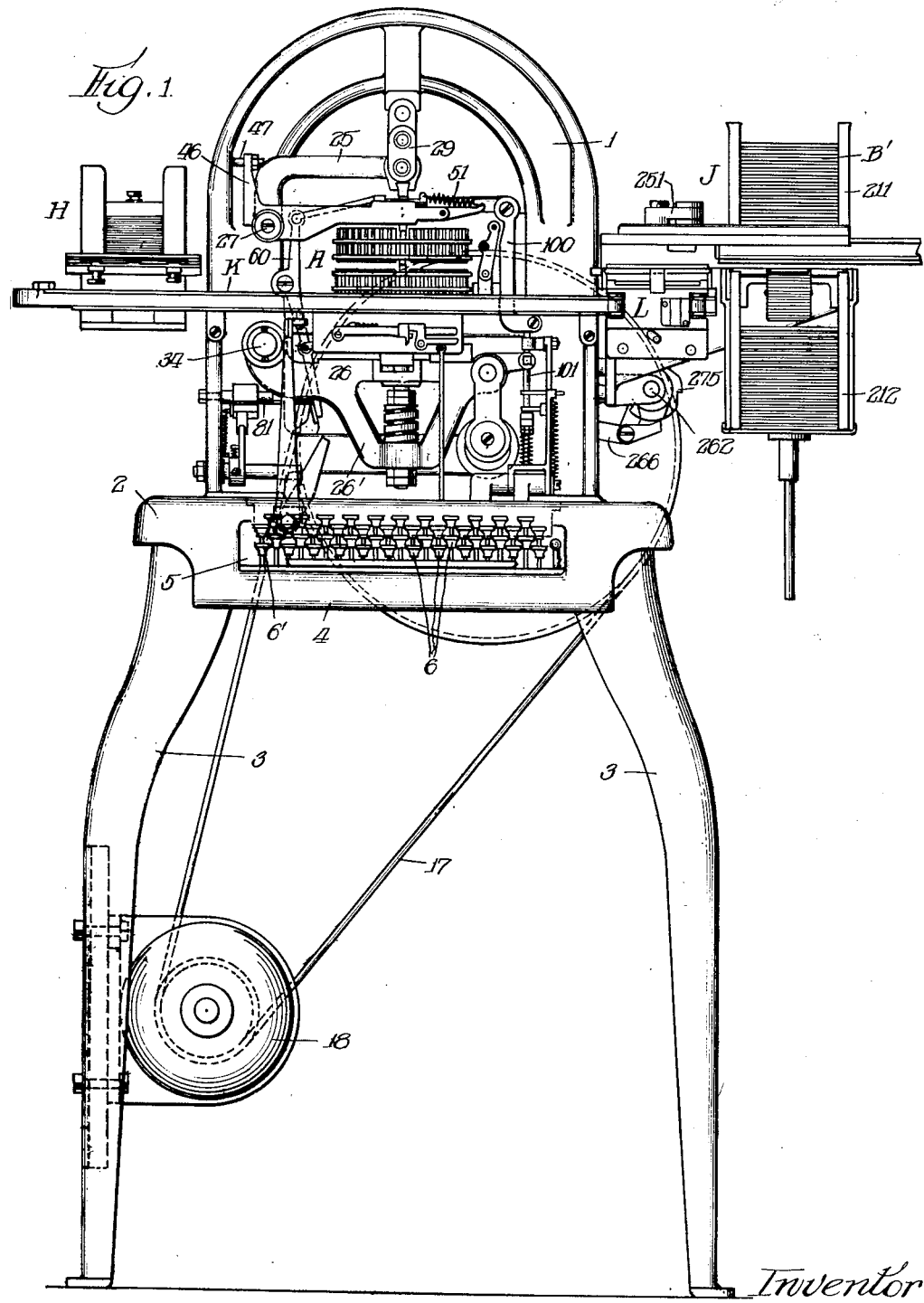
Fig. 1 is a view in elevation of the front of a printing plate embossing and replacing mechanism embodying the invention.

The machine shown in the drawings Figs. 1, 2, 3, 4, 5, 6 and 10 has an upstanding arch shaped frame 1 mounted upon a table 2 which is supported by suitable legs 3. The front portion 4 of the table is inclined downwardly and has an opening 5 for the bank of operating keys 6 forming the keyboard. The die head or carrier A, which carries the embossing dies, is positioned in the central portion of the arch shaped frame, Figs. 1, 2, 3 and 4 and is mounted on a vertical spindle 8 to rotate in a horizontal plane. The spindle is journaled in suitable upper and lower bearings 9 in the frame and is driven by means of the beveled gears 11 and the spur gears 12 and 13 from the belt driven pulley 14, Figs. 1, 2 and 4. One of the beveled gears 11 and the spur gear 12 are mounted on a short shaft journaled in suitable bearing 15 on the frame. The pinion gear 13 is mounted on the main shaft 16 journaled in the frame, and this shaft carries the pulley 14 which is driven by the belt 17 from a suitable driving motor 18 attached to the legs of the frame beneath the table.

A clutch 20 forms a driving connection between the beveled gears 11 and the spindle 8. This clutch may be of any suitable type for the purpose and needs no further description except that it is preferably so constructed that when the die carrier is not restrained against rotation, as hereinafter described, the clutch will drive the spindle and die carrier at uniform speed. However, when the die carrier is restrained against rotation the clutch members will simply slip relatively to each other thus permitting the power shaft to run continuously.

Figure 3:
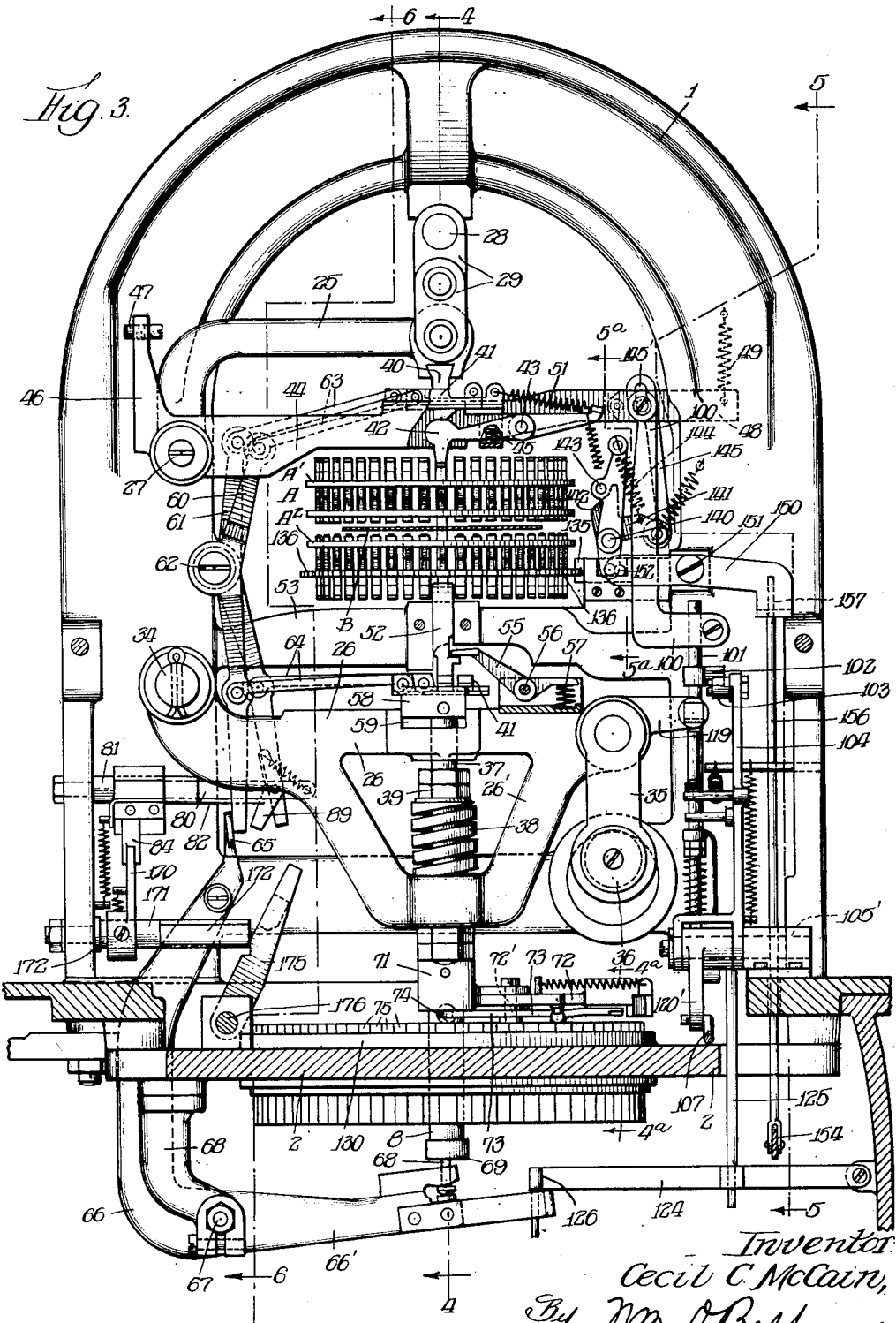
Fig. 3 is an enlarged front elevation of the embossing mechanism, the plate carriage mechanism having been removed and the frame table being shown in section substantially as indicated by the line 3—3 of Fig. 4.
Figures 4, 4A:
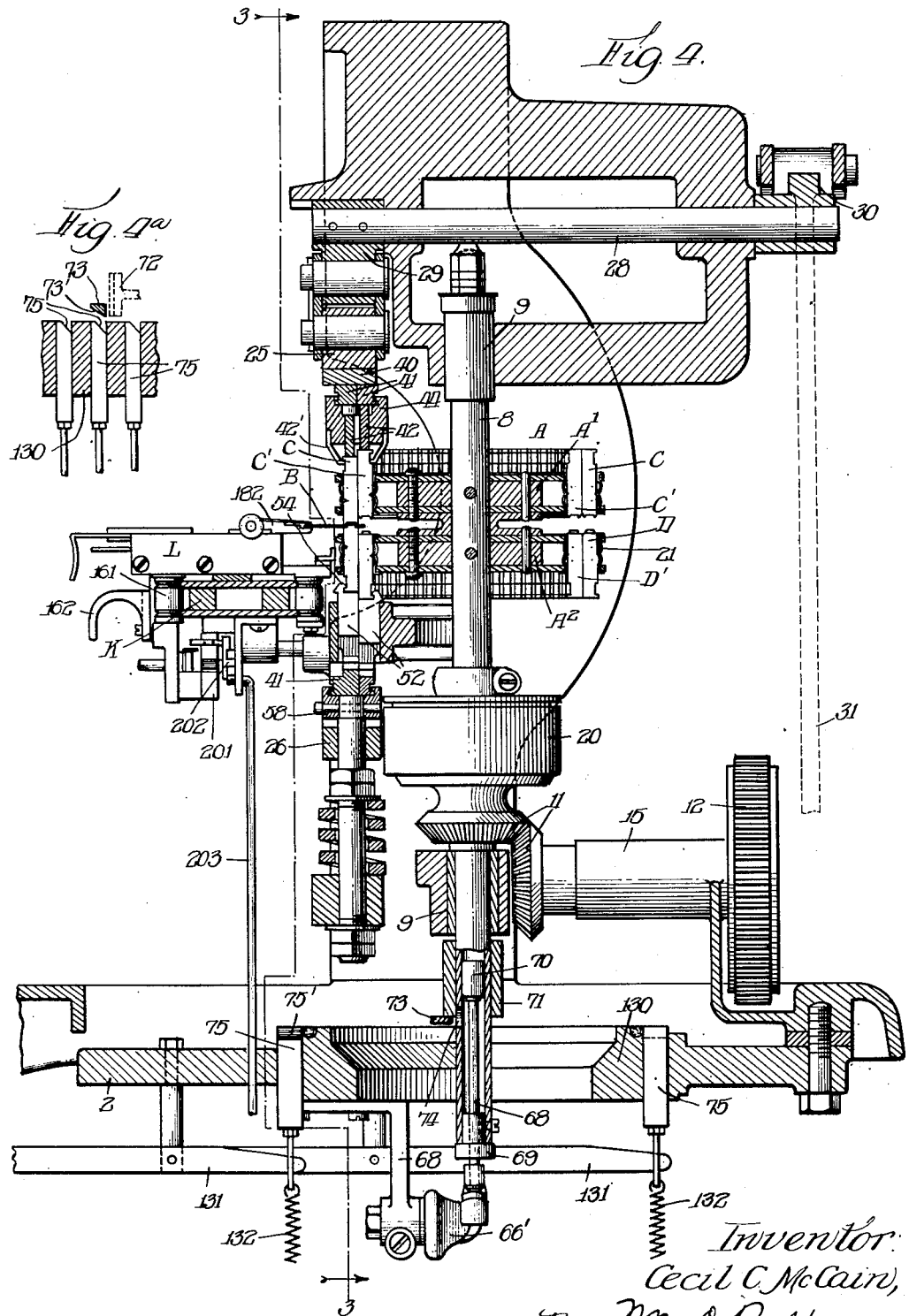
Fig. 4 is a vertical section on the line 4—4 of Fig. 3, showing the plate carriage in embossing position.
Fig. 4a is a detail section on the line 4a—4a of Fig. 3.

The die carrier A is comprised of two cage members A' and A2, Figs. 3 and 4, keyed to the spindle to rotate in unison therewith. They are spaced apart one above the other to permit the printing plate blank to be positioned therebetween. The upper cage member A' carries the dies C and C' and the lower cage member carries the complementary punches or dies D and D'. These die members are arranged in two annular concentric series in their respective cages and are mounted to slide vertically in radially disposed slots, with the dies C and C' in the upper cage vertically aligned with the corresponding punches D and D' in the lower cage, and each die member is provided with a small notch which is yieldingly engaged by a small spring 21 to yieldingly hold the die members in their upper or withdrawn position. In the present structure I provide the two series of pairs or sets of die members, one for embossing lower case letters or characters and the other for embossing upper case or capital letters. The outer series, comprising the dies C and D, constitute the sets for embossing the lower case letters, while the inner series, comprising the dies C' and D', constitute the sets for embossing the upper case or capital letters. The printing plate blank B, which is being embossed, is shifted radially with respect to the inner and outer series, as hereinafter described, for the purpose of embossing upper or lower case letters.

The die members are operated by power driven rocker arms 25 and 26, Fig. 3. The upper rocker arm is pivoted at 27 to one side of the frame and its inner end is connected to the rock shaft 28 by the toggle links 29. The rock shaft 28 is journaled in the upper portion of the arch frame and extends to the rear side thereof, Figs. 2 and 4, where it is connected by another toggle mechanism 30 and the link 31 to an eccentric 32 on the main shaft 16. The lower rocker arm 26 is pivoted at 34 to one side of the frame and extends across beneath the die carrier where it is connected by a short link 35 to a crank 36 on the forward end of the main shaft 16, giving a short intermittent stroke in time with the upper rocker arm. The upper rocker arm is timed slightly in advance of the lower rocker arm 26 so that the upper die will be in position against the printing plate blank in time to receive the lower die member or punch.

The rocker arm 26 has an integral depending yoke portion 26' and the lower end of this yoke and also the rocker arm has bearings for the pressure rod 37 which transmits pressure to the punches. This pressure rod is longitudinally movable in said bearings, and a heavy coil spring 38 surrounds the pressure rod and is positioned between the collar nuts 39 on the rod and the yoke 26'. This compression spring constitutes a safety device which will transmit the required operating pressure to the die members, but which will yield in the event that the dies become jammed by some abnormal condition, thereby preventing damage to the dies. The end of the upper rocker arm 25 carries an anvil 40 which bears upon either one or the other of two shuttles 41, depending upon which one of these shuttles is positioned in line with the anvil on the downward stroke thereof. There are two of these shuttles, Figs. 3 and 4, one for the dies of each series.

The pressure on the shuttles is transmitted to the corresponding die members by means of the fingers 42, which are aligned with the respective shuttles and dies.

The fingers are pivotally mounted at 43 on the shuttle arm 44 and are acted on by springs 45 which swing the fingers upward clear of the dies after each embossing operation. The shuttle arm 44 is pivotally mounted at one end on the same pivotal axis 27 as the rocker arm 25 so it will swing about said pivot to follow the movement of the rocker arm and maintain the shuttles and fingers in operating relation to the anvil. The arm 44 has an extension 46 carrying a screw 47 which engages the frame and serves as an adjustable stop to limit the upward movement of said arm. The shuttle arm 44 also has another extension 48 reaching to the other side of the frame and a spring 49 is connected to this arm and to the frame for swinging the arm 44 upwardly after each embossing stroke.

The shuttles 41 slide horizontally in suitable guideways on the arm 44, to move them into and out of position with respect to the anvil. Springs 51 are connected to the arm extension 48 and to the shuttles to move them into position beneath the anvil 40. The dies are retracted into normal position after each embossing operation by means of the hooks 42' carried by the lower edge of the arm 44, Fig. 4. The ends of these hooks engage elongated notches in the sides of the dies which allow the dies to move freely downwardly but which engage the ends of the notches and retract dies on the up stroke of the rocker arm.

In the case of the lower series of punches the anvils 52 slide vertically in suitable guideways in a cross member 53 of the frame, Figs. 3 and 4, and the upper ends of these anvils engage elongated notches 54 in the edges of the die members for withdrawing the die members after each embossing operation. These anvils are withdrawn by finger 55 which pivots at 56 on the rocker arm 26, Fig. 3, and is actuated by spring 57. The guide 58, Fig. 3, for the lower shuttles 41 is mounted on the end of the pressure rod 37, hereinbefore described, and is itself guided in a slot 59 in the rocker arm 26. At one side of the arch frame is a pair of rock levers 60 and 61 which are pivotally mounted at 62 on the frame and intermediate their ends. The upper ends of these levers are connected by the links 63 to the upper shuttles. Below their pivots the rock levers are connected by links 64 to the lower shuttles, so that the swinging of these levers 60 and 61 about their pivot operates to slide the upper and lower shuttles out of engagement with the anvils. The lower ends of rock levers 60 and 61 are normally held against movement by the end 65, Fig. 3, of a bellcrank 66 which is pivoted at 67 on the end of a depending arm 68 on the under side of the frame table. The end 65 of the bellcrank normally holds the rock levers 60 and 61 in the position in which the lever 61 is shown in Fig. 3; that is in a position to maintain the shuttles out of line with respect to the anvils. Thus the rocker arms may oscillate or vibrate without operating the dies. When the bellcrank is operated to retract its end 65 the levers 60 or 61 will be operated by the springs 51, hereinbefore described, to move the shuttles into operating relation to their respective anvils. The lower arm 66' of the bellcrank extends to a point beneath the lower end of the vertical spindle 8, and its end is connected to the projecting end of a stem 68 which is vertically movable in the lower tubular end portion of the spindle 8.

The operation of this stem is controlled by the keys 6 in the keyboard, as will be presently described. The stem 68 is slidable in a bushing 69 in the lower end of the spindle and the upper end of the stem has an enlarged head 70 which slidingly fits the tubular portion of the spindle. The spindle has a hub 71 carrying a radial striker arm 72 which carries a trigger 73 pivotally mounted at 72' on said arm and having one end extending through an opening 74 in the side of the spindle, Fig. 4. This end of the trigger is normally held in the path of the head 70 of the stem and engages the end of the head to prevent the stem from sliding upwardly in the spindle. The radial striker arm 72 carried by the spindle sweeps around with the rotation of the spindle above an annular series of key stops 75 which are normally held retracted or out of the path of the arm. When, however, a stop is projected upwardly into the path of the striker arm, the outer end of the trigger reaches the stop slightly in advance of the striker arm and is rotated on the pivot to release the head 70, allowing the stem to slide upwardly in the tubular spindle. This permits the bellcrank to swing on its pivot and retract its upper end 65 which in turn allows one of the rock levers 60 and 61 to operate as hereinbefore described. The striker arm comes to a stop against the projected key stop, and, as hereinafter described, a register stop engages the die carrier and holds the die carrier against rotation until another key is depressed. In the meantime, however, the key stop is restored at the end of the embossing cycle. In order to enable the same character to be repeated, even though the die carrier is held in the position corresponding to said character, I provide the end 73' of the trigger and the upper ends 75' of the key stop, Figs. 4 and 4a with beveled faces. Upon a second or repeated depression of the same key, these beveled faces act to rotate the trigger 73 about its pivot and again release the stem 70 whereupon the second embossing cycle of the same character is brought about in the same manner as brought about by the depression of any other key.

It is obvious that both of the levers 60 and 61 should not be operated at the same time because they would bring both sets of anvils into position and cause the simultaneous embossing of the upper and lower case letters. For this reason I provide a case shift mechanism controlled by a shift key 6' in the keyboard, Figs. 6, 6a, 6b and 6c. A stud 80 is fastened to the frame and extends horizontally between the lower ends of the rock levers 60 and 61. Its outer end portion has parallel flat faces on both sides. A sleeve 81 is rotatably mounted on this stud and its end is cut away for most of its circumference so as to provide a segmental extension 82, Fig. 6c, which is positioned to engage the ends of the levers 60 and 61 and prevent their movement even though the end 65 of the bellcrank has been retracted. The end of this segmental extension is not wide enough, however, to engage and hold both of the rock levers 60 and 61 at the same time. It is normally in position, however, to hold the upper case rock lever 61 from operating, and to permit the operation of the lower case lever 60 upon the retraction of the end 65 of the bellcrank. Thus each time the bellcrank is operated the lower case lever 60 will operate to bring about the operation of the lower case dies. When an upper case letter is to be embossed the sleeve is rotated to the position shown in Fig. 6b by the operation of the shift key 6'. When thus rotated the end of the segmental extension 82 is removed from the path of the lever 61 and moved into the path of the lever 60 thus permitting the lever 61 to operate upon the retraction of the bellcrank end 65 and prevent the operation of the lower case lever 60. The sleeve 81 has two arms 83 and 84. The arm 83 is connected to a spring 85 which is anchored to the frame, and which normally holds the sleeve in the position shown in Fig. 6a, thus permitting the normal operation of the rock lever 60. The other arm 84 is actuated by a rod 86 to rotate the sleeve to the position shown in Fig. 6b when the shift key is depressed. This push rod 86 is connected to one arm of a bellcrank 87 pivoted on the frame and having its other arm connected by a link 88 to the end of the shift key lever 6'', Fig. 6.

The end of the stud 80 projects beyond the segmental extension 82 of the sleeve 81 and has a pivoted spring actuated latch 89, Fig. 3, which engages either one of the two notches 90, Figs. 6a, 6b and 6c, to lock the sleeve in its normal position or its rotated position. The end of this latch extends downwardly in position to be engaged by the end 65 of the bellcrank 66. The end 65 of the bellcrank normally holds the latch out of engagement with either of the notches 90 but when the bellcrank retracts its end 65 in response to the operation of the key, as hereinbefore described, the latch enters one of the notches 90 and locks the sleeve 81 against rotation. Upon the restoration of the bellcrank to normal position its end 65 engages the latch and releases it from the notch 90. If the sleeve 81 had been previously rotated by the operation of the shift key 6', the release of the latch 89 permits the sleeve 81 to return to its normal position, Fig. 6a.

All of the key levers including the shift key lever 6'', extend forwardly the same distance and each lever carries a hook 91 which engages the edge of a spring actuated locking bar 92, Figs. 5 and 6, to hold the key and its lever down until the locking bar is actuated to release said depressed key. The shift key may be maintained in depressed position independent of the locking bar 92 by means of the usual shift key lock 6''' for repeating the embossing of upper case characters.

The extension 48 of the arm 44, Figs. 1, 3 and 5, has a downwardly extending arm 100, the lower end of which is turned laterally and and fastened to the upper end of a vertical push rod 101, so that the push rod is reciprocated constantly by the vibration of the arm. The lower end of this push rod is guided in a suitable bearing in the frame table, Fig. 5. This rod 101 carries a cam 102 which is engaged by a roller 103 on the lever 104 pivoted on the shaft 105 on the frame. The roller end of this lever 104 is normally maintained in operative relation to the cam 102 by means of the spring 106 which is anchored at one end to the frame and at the other end to a short arm on said lever Fig. 5. An arm 120' of lever 120 which is pivoted on shaft 105 extends downwardly and is connected to one end of a link 107. The other end of the link 107 is connected to the upright one of a three-arm releasing device including shaft 109 mounted below the keyboard. The arm 110 of this three-arm device extends to a point adjacent the lock bar 92 in position to actuate the lock bar and release any of the depressed keys held thereby. The arm 111 of the three-arm device engages a roller 112 on the pivoted arm 113 of the restoring bar 114. The restoring bar 114 extends transversely of the keyboard the entire width thereof and is positioned beneath all of the key levers so that whenever a key lever is depressed it will actuate said bar. This bar 114 controls the restoration of the die carrier registering and holding stop as hereinafter described. However, it will be seen that whenever the three-arm device is rocked about its pivot, the arm 111 acting on the roller 112 will raise the bar 114 upwardly, returning the bar to normal position and restoring the key lever which depressed said bar. The three-arm lever may also be operated independently of the arm 120' by means of the hand lever 115 which is pivoted at its lower end on shaft 109 and which has its upper end positioned in engagement with the upright arm of the three-arm device. The link 107 has a telescoping portion 107' forming the slip joint which permits the three-arm device to be operated independently of the link.

Each time the dies are operated, the rod 101 is moved downwardly, lowering the cam 102 and allowing the roller 103 to ride thereon. The lever 104 has a pin 116, Fig. 5, which swings the upper end of a trip rod 117 into the path of a lug 118 carried on the end of a short arm extension 119, Fig. 3, of the rocker arm 26, so that the trip rod 117 will be pushed downwardly by said lug. When thus pushed downwardly it actuates the lever 120 and restores the key through the medium of link 107 and the three-arm device just described. The trip rod is slidable in bearings in a U-shaped member 121 which is pivoted on the lever 120. A coil spring 122 surrounds the trip rod between the lower bearing of member 121 and a collar on the rod. The spring serves as a shock absorber to the blows on the rod by the lug 118. When the trip rod is released by the return of the lever 104, the trip rod will be removed from the path of the lug 118 by the spring 122 connected between the trip rod and the short arm on the lever 104, and the lever 120 will be returned to its normal position by the spring 123 connected to said lever and to the frame.

The lever 120 is pivoted on shaft 105 and operates, on downward stroke of push rod 117, a lever 124 through the medium of the link 125 which is connected to said lever 120 and extends downwardly into engagement with the lever 124. The lever 124 is positioned beneath the table and is pivoted at one end to the frame. Its other end 126 is connected to the end of the arm 66' of the bellcrank 66, Fig. 3, so that the bellcrank will be restored to normal position after each cycle of operation of the parts, as hereinbefore described. The restoration of the bellcrank 66 retracts the stem 68 in the lower end of the spindle and restores the trigger 73, thus restoring the parts for the next embossing operation.

The radial arm 72, as hereinbefore mentioned, sweeps in a horizontal path above the ends of the key stops 75. These key stops, Figs. 3 and 4, are arranged in circular series and slide vertically in suitable guides in a guide member 130 mounted in the frame table. Each one of the key stops 75 is connected to a key lever 131 which carries a key 6 in the key board. The stops are normally held down in their guides by the springs 132 but are projected upwardly upon the depression of a key, into the path of the radial arm 72 so that they stop the rotation of the die carrier with the dies in embossing position corresponding to the depressed key.

In order to lock the die carrier against rotation and to register the dies while the embossing operation takes place, I provide a register stop 135, Figs. 3, 5a and 5b. This stop is moved into engagement with register notches in the edge of a flange 136 around the periphery of the lower die cage A2. The register stop is slidable in a suitable guide block 137 on the frame. It is moved into and out of engagement with the register notches of the die carrier by a lever 138 to which it is pivoted by means of the pin 139, Figs. 5a and 5b, the pivot pin extending beyond the lever. The lever 138 is pivoted on the shaft 140 and this shaft 140 carries a small bellcrank 141. The end 142 of one arm of this bellcrank engages a pin 143 on the lever 138 and when the bellcrank is rotated it swings the lever 138 about its pivot and permits the register stop 135 to be projected into engagement with a die carrier notch by the spring 144 which is connected between the upper end of the lever 138 and the bellcrank 141. The bellcrank 141 is operated by the extension 48 of the upper arm 44 through the medium of a link 145. The link 145 has a pin and slot connection 145' with the extension 48 which permits the arm 44 to vibrate without affecting the register stop 135 as will appear hereinafter. These parts are so proportioned that the register stop engages the die carrier slightly before the dies come together to emboss the printing plate. This can be done, of course, because the rotation of the die carrier will already have been stopped by the key stop 75 hereinbefore described. When the arm extension 48 moves upwardly after the embossing operation is completed, the spring 141, unless otherwise restrained as hereinafter described, will swing the bellcrank into engagement with the pin 143 on lever 138 and operate lever 138 to withdraw the register stop 135. This would release the die carrier for rotation and the die carrier would then continue rotating until another key is depressed. In other words the depression of a key would stop the rotation of the die carrier for a period long enough to complete the embossing operation in response to said key, but the die carrier would be rotating idly during the periods between key operations. This is a disadvantage in machines of this character because it limits the speed at which the embossing operations can be performed. For instance if a character is to be embossed twice in succession, the second embossing operation must wait until the die carrier has made one complete revolution after its release from the first embossing operation of said character.

In the present machine I provide means for holding the die carrier against rotation during idle periods between embossing operations. In this machine the die carrier is released for rotation by the depression of a key, and when it reaches the stop corresponding to the depressed key the embossing operation takes place but the die carrier will be held stationary until the next key is depressed. If the next key depressed happens to be the same key as the one last operated, for the purpose of repeating the same character, the die carrier will not rotate but instead will remain stationary through said second embossing cycle of the same character. The holding of the die carrier is accomplished by a locking lever 150, Figs. 3, 5 and 5a, pivoted at 151 on the frame. At one end this locking lever has a lateral pin 152 which is moved by the lever 150 upwardly into position behind the pin 139 of the register lock 135 when said register lock is in engagement with the die carrier, this movement of lever 150 being brought about by the spring 153 which is connected between the pin end of said locking lever and the extension 48 of the arm 44. This holds the register lock 135 in engagement with the die carrier until it is released by the depression of the next key. The release of the register lock is accomplished by a lever 154, Fig. 5, positioned at one side of the frame and extending into the keyboard and connected at its forward end by the link 155 to the restoring bar arm 113. The rear end of this lever 154 is pivotally connected to a link 156 which extends upwardly alongside the frame and has a shouldered end 157 which extends through a hole in the outer end of the locking lever 150 to provide a sliding connection which permits the locking lever to swing in the locking direction under the influence of spring 153 and independently of the link 156. However, the depression of any one of the keys, depresses the restoring bar 114 and operates lever 154 to lift the link 156 and actuate the locking lever 150 in a direction to release the register lock 135, and thereby release the die carrier for rotation. The die carrier will then rotate a portion of the revolution until it is stopped at a point corresponding to the depression of the last key, whereupon the embossing cycle of operation will be completed including the operation of the register lock to hold the die carrier. The die carrier now remains in non-rotating or idle condition until the next key is depressed.

The printing plate blanks B to be embossed are stacked in a supply magazine H positioned at the left side of the frame, Fig. 1. A long carriage guide member K extends horizontally across in front of the frame in position to support the printing plate carriage L in relative operating relation to the magazine H, the embossing dies, and the ejecting and inserting mechanism J. The printing plate carriage L has a frame plate 160, Figs. 9, 13, and 14, positioned above the guide bar K, and on its under side the carriage frame has grooved rollers 161 which engages the edges of the guide bar K to support the carriage on said guide bar. The carriage has a finger piece 162 by which the operator may conveniently shift the carriage on said guide bar throughout its range of movement. At the ends of the guide bar the reels 163 and 164 are provided around which a belt or band 165 is stretched. The carriage, Fig. 13, is fastened at 164' to a point on the belt, and one of the reels, preferably the reel 163, is spring actuated (not shown) in any of the well known manners for this purpose. In the present structure the spring reel urges the carriage L to the right and towards the ejecting mechanism J, and the operator shifts the carriage to the left against the tension of the spring reel.

Figure 2:
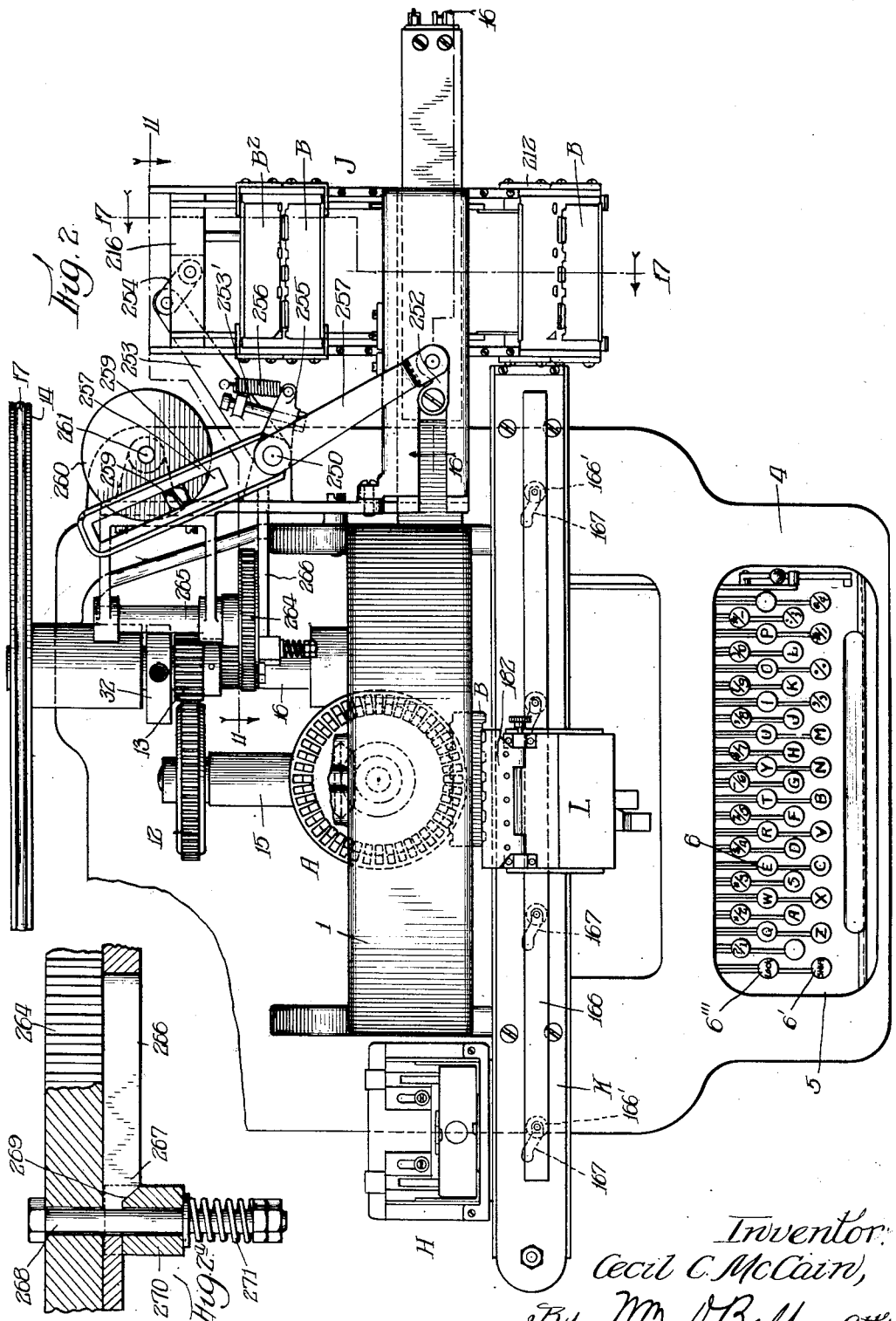
Fig. 2 is a plan view showing the general arrangement of the parts and mechanisms of Fig. 1.

The guide bar K supports on its upper side a shift bar 166 which has a plurality of headed bolts 166' Figs. 2, 7 and 9, extending through and operating in the diagonal slots 167 in the guide bar K so that when the shift bar is moved longitudinally the diagonal slots will cause it to move laterally as well. The printing plate carriage frame 160 has a sub-frame 168 which has a sliding movement in the guideways 160' on the frame 160 to shift the printing plate blank relatively to the embossing dies for the purpose of positioning the blank for lower or upper case letters. This shifting movement is radial with respect to the die carrier. The sub-frame 168 has rollers 169' Figs. 12, 13 and 14, which extend through clearance slots 169 for engagement with the edges of the shift bar 166 so that said bar 166 will shift the sub-frame. Thus it will be seen that although the shift bar 166 has a diagonal movement due to the slots 167, the resultant movement of the sub-frame 168 will be in a direction transverse to the longitudinal axis of the guide bar K and hence will be radial to the die carrier. This movement of the printing plate blank is provided for the purpose of shifting the blank for upper and lower case characters.

The printing plate blank is normally held in position to receive the lower case characters but when the shift key 6' in the keyboard is depressed, as hereinbefore described, Figs. 3, 6, 6a, 6b, it swings the arm 84 from the position shown in Fig. 6a to that shown in 6b. This arm 84 swings an arm 170 and rotates a sleeve 171 on which it is carried. The sleeve 171 is mounted on the stud 172 which has a flattened end portion 173. The sleeve 171 has a segmental extension 174 which normally holds another lever 175 against rotation.

When the sleeve 171 is rotated its segmental end portion 173 releases the lever 175 and this lever rotates the shaft 176 on which it is mounted. The rotation of the shaft 176 swings an arm 177 which has at its upper end a lateral portion 178 engaging a pin 179 on the shift bar 166. The arm 177 normally holds the shift bar 166 against the tension of spring 180, Fig. 7, in position for lower case type, but when the arm 177 is swung it allows the shift bar to be moved to the inner ends of the diagonal guide slots 167 by the spring 180. Upon the restoration of the parts by the springs 85 and 181, Figs. 6a and 6b, the arm 170 will be restored. This swings the arm 177 and restores the shift bar to the outer ends of the slots 167, thereby withdrawing the printing plate blank to lower case position. The pin 179 has an antifriction roller and the lateral end 178 of the arm 177 is sufficiently long to adapt it to the diagonal movements of the shift bar and still maintain the contact between the pin 179 and the lever 177.

The printing plate blanks B are gripped at one edge by a vise 182, Fig. 13, which is mounted on the line shift plate 183. The line shift plate 183 is slidably mounted in suitable guideways on the sub-frame 168, enabling the operator to shift the printing plate blank relatively to the embossing dies for line spacing of the characters. The line shift plate is normally held by a spring 184 in position for the first line to be embossed on the printing plate blank. By pressing on the finger piece 185 the operator can shift the blank to position it for the second and third or subsequent lines of characters. The line shift plate is held in its different positions by a spring catch 186 which engages notches 187 on the under side of the line shift plate corresponding to the line spacing. The vise 182 comprises two members the upper member of which is of spring material and has a sharp knife like gripping edge 182'. This vise is arranged to yieldingly grip the edge of the printing plate blank, Figs. 9 and 13. The vise is pivoted at 188 on the line shift plate whereby it can be swung upwardly in the event the operator wishes to remove a blank.

The printing plate blanks B are in the form of thin, flat, rectangular strips of metal having series of notches B⁴ along opposite edges, Fig. 7. They are stacked in the magazine H, Fig. 9, and the stack rests upon the bottom 189 thereof. The rear wall of the magazine has a vertical guide member H' which engages with the corresponding notches B⁴ of the blanks in the stack. Two parallel ejector bars 190 are slidably mounted on the supporting plate 191 on the frame beneath the magazine bottom 189. The ejector bars are normally held in retracted position by springs 192 which are connected between pins on the supporting plate and pins 193 on the ejector bars, slots 194 being provided in the supporting plate to allow movement of the ejector bars. The ejector bars have lugs 195 which extend upward through slots 189' in bottom 189 just sufficiently to engage the rear edge of the lowermost blank in the stack and slide it forwardly when the ejector bars are operated. The lower edge of the front wall 196 of the magazine is spaced above the bottom 189 and has separator blocks 196' which can be adjusted above the bottom 189 substantially the thickness of one blank to permit only the lowermost blank of the stack to be removed.

The lowermost blank of the stack is thus projected from the magazine a sufficient distance to release it from the guide member H' and place its forward edge in the path of the vise 182 so that when the operator shifts the plate carriage to the left along the guide bar K, the vise engages the edge of the projected blank at the right hand corner thereof, slides along in gripping engagement with the blank until the carriage reaches the limit of its movement. The knife edge 182' of the vise scores a slight groove in the face of the blank as it slides and forms a very effective gripping contact. Movement of the plate carriage to the right, Fig. 7, extracts the blank from the magazine in a direction lengthwise of the blank and parallel to the movement of the plate carriage. The guide member H' holds all of the blanks in the magazine against lengthwise movement except the lowermost blank which is in a forward position with its notch clear of guide member H'.

In order that the withdrawal of the blank will be entirely automatic the plate carriage is provided with a cam bar 197 which extends to the left of the carriage parallel with the line of movement of the carriage. This cam bar has two cam surfaces 198 and 199 which engage the rollers 200 on the ejector bar 190. The cam surface 198 is in a plane above the cam 199 and the rollers 200 are correspondingly positioned so that both rollers 200 will be engaged at the same instant. The rollers ride up on their respective cam surface and operate the ejector bar to extract the lowermost blank from the stack. This operation takes place slightly before the vise reaches the projected blank so that the blank will be in position to be engaged by the vise as the carriage movement is continued to the left.

Having gripped the plate in the vise the operator now shifts the carriage to embossing position. In this position the carriage, by means of a tooth rack 201, engages an escapement mechanism 202, Figs. 4, 13 and 14. This escapement mechanism may be of any suitable or well known type for the purpose and need not be further described except that it is controlled by the keys through the medium of the link connection 203, for the purpose of shifting the carriage to space the characters in line on the blank being embossed.

After finishing the embossing operations upon the blank the operator releases the carriage from the escapement mechanism and allows the spring reel to shift the carriage to the right to position the embossed blank with respect to the ejecting and inserting mechanism J, Figs. 2 and 12 to 18. This machine provides for embossing three lines of characters on the printing plate, although, of course, any number of lines can be provided for. However, I have arranged the parts so that the embossed plate will be in alignment with the ejecting mechanism J when the plate is in position for embossing the third or last line.

The ejecting and inserting mechanism comprises in general an ejector bar and printing device frame feeding mechanism. The ejector bar is positioned in the rear of the plate carriage and reciprocated in a direction parallel to the movement of the plate carriage on its guide bar K. The printing frame feeding mechanism is positioned at the right hand end of the carriage guide K, underlying the ejector bar and reciprocating in a direction transverse to the line of movement of both the plate carriage and the ejector bar.

Addressing or printing devices of the character for which this machine is particularly adaptable comprise the rectangular frames B', Fig. 12 and 17, upon the lower portion of the front face of which the embossed printing plates B are mounted, and upon the upper portion of said face the information cards B2 are mounted. The top and bottom edges 205 and 206 of the frames are turned over upon the face to form holding clips for the outer edges of the information cards and printing plates respectively. The inner edges of the cards and printing plates are held by similar clips 204 struck up from the face of the frames. The information cards and printing plates are removed from or placed on the frames by sliding them lengthwise parallel with the face of the frame. Corner clips 208 are formed upon the frames for holding the information cards in place against lengthwise movement. The information card, being comparatively flexible, can be detached from the frame by simply crimping the end portion and slipping the card over the end clip at the right of the frame. The printing plates are held by similar clips 209 at the ends of the plates, but, since the printing plates are comparatively stiff, the clips are formed at the ends of integral spring tongues 210 which are intended to be flexed downwardly to permit the insertion or removal of the printing plates.

The printing devices are stacked in a vertical magazine 211 at the rear end of the feeding mechanism, and from this stack the lowermost printing devices are successively removed and carried forward into position on the bed 213 to receive the newly embossed printing plate from the ejector bar, after which the printing devices are moved further forward and discharged into a receiving chute 212, Fig. 17. The stack of printing devices rests upon the edges of the U-shaped channel members 214 in which the feed bars 215 reciprocate. These feed bars are connected at their rear end by the cross member 216, Fig. 2, so that they will move in unison, and they are provided with spring actuated dogs 217, Figs. 16 and 17, which engage the spacing beads formed at the ends on the rear faces of the printing device frames. The movement of the feed bar is sufficient so that the rear feed dogs 217 carry the printing device frame from the stack to the receiving position, and the forward feed dogs carry the printing devices from said receiving position to the discharge chute.

In order that the printing devices may be very accurately lined up with the newly embossed plate so that said plate will properly enter the holding clips on the frame, I provide a pair of stationary spring dogs 218 over which the printing device frame rides while moving to receiving position. As the frame passes beyond the dog the dog rises up to engage the edge of said frame and stops the frame against any possible reverse movement. A swinging gate stop 219, Figs. 12 and 17, is pivoted at 220 to the frame and its upper end is normally held in a downwardly swung position away from the path of the printing devices by means of the spring 221 which is connected between the lower end of the gate stop and the machine frame. The rear end of the feed mechanism carries a forwardly extending rod 222, the forward end of which is adapted to engage the lower end of the gate stop and swing its upper end into position to form a positive stop for the forward edge of the printing device frame moving into receiving position. This operation takes place on the forward movement of the feed mechanism just as the printing device frame reaches the receiving position, and the stop acts to clamp the printing device frame between itself and the dog stops 218. The gate stop also serves to bring the printing device frame back against the dogs 218 in the event that the frame should override the receiving position on its forward movement. In order to insure further accuracy in positioning the printing device frame, the feed mechanism is accurately stopped by an adjustable stop pin 222', Fig. 17, which is engaged by the cross bar 216 on the feed stroke of said feed mechanism. It will be noted that the bed 213 at the receiving position is vertically adjustable in the frame by means of the screws 223, Fig. 15, and that the guide channels 214 are likewise vertically adjustable in the frame so that the height of the printing device frame may be very accurately adjusted.

By shifting the plate carriage to the right the operator positions the embossed printing plate carried thereby on a supporting bed 225 beneath the ejector bar. This bed also is adjustable by means of the screws 226 to accurately line it up with the bed 213. As the ejector bar is moved to the left Figs. 15 and 16, it is lowered into engagement with the newly embossed printing plate and also the printing plate in the printing device frame which is in position. On its operating stroke to the right the ejector bar removes or ejects the printing plate from the printing frame and inserts the newly embossed printing plate in place thereof. It is obvious, however, that if there should be no printing plate already in the printing device frame the ejector bar will simply insert the newly embossed plate in said frame.

The ejector bar, Figs. 15, 16 and 17, is made up of upper and lower parallel sections 227 Fig. 13 having vertical flanges 228. The flanges on the lower section are positioned between the flanges on the upper sections so that the two sections have a telescoping movement. The upper section is guided in a suitable guideway in the frame which overhangs the feed bar. The lower section is movable vertically but in parallel relation to the upper section the two sections being guarded against relative lengthwise movement by the end member 232. The lower section is normally suspended in its upper position by the springs 229 connected to both upper and lower sections at the ends thereof, Figs. 12 and 15. The lower section carries a cam bar 230 which is positioned within the ejector bar between the flanges thereof and is mounted for lengthwise movement. This cam bar and the upper section 227, carry a plurality of cam lugs 231. These cam lugs are so related that just as the ejector bar is arriving at the limit of its stroke to the left the cam lugs on the cam bar ride on the cam lugs on the upper section, thereby forcing the lower section 227 downwardly against the tension of springs and into engagement with the printing plate. This action is brought about by one of the stops 234, Figs. 12 and 17, which engage lug 233 on the edge of cam bar 230, the lug 233 extending through clearance slots in the flanges of both upper and lower sections. The engagement of lug 233 with stop 234 holds the cam bar against longitudinal movement while the ejector bar continues to move slightly further. In like manner at the right hand end of the stroke a similar lug 233', Fig. 17, on the cam bar engages one of the stops 234, thereby holding the cam bar and causing the cams 231 to ride off each other and permitting the springs 229 to restore the lower section to its normal upper position. The stops 234 are adjustably fastened by screws 234' so that their engagement by the cam bar lugs can be accurately timed.

The lower section of the ejector bar has a channelled strip 235 on its underside, the flanges of which, Fig. 17, engage the newly embossed printing plate on the bed 225 and the printing plate to be ejected from the printing device frame thereby firmly holding these printing plates against the supporting bed and printing device frame and insuring the entrance of the newly embossed plate into the holding clips on the printing device frame. The ejector bar has two ejector lugs 236 and 237 which are fastened on the underside of the strip 235. When the ejector bar is lowered at the end of its left hand stroke the forward lug 237 engages the end of the printing plate in the printing device frame if there should be a plate therein to be ejected, and the rear lug 236 engages the end of the newly embossed plate in the carriage vise. Upon its stroke to the right the ejector bar lugs slide the printing plates simultaneously to the right, ejecting the newly embossed plate from the carriage and ejecting the old printing plate from the printing device frame, and inserting the newly embossed plate in the frame. The old printing plate which is removed from the printing device frame is simply discharged from the end of said frame and may be caught in a suitable basket provided therefor.

The right hand end of the ejector bar carries a pawl 238 which is pivoted on the end of the lower section thereof, Fig. 15a. It has a shoulder 239 which is yieldingly held against the ejector bar by the spring 240. This pawl is positioned so that as the ejector bar section is lowered at the end of its left hand stroke, the end of the pawl 238 presses upon the spring clip 209 of the printing device frame and presses said clip downwardly to release the printing plate from the printing device frame. When the ejector bar moves to the right the end of the printing plate rides over the clip 209 and itself holds the clip down throughout the remainder of its movement. The opposite spring clip 209 on the left hand end of the printing device frame is curved so that the end of the newly embossed plate simply engages the clip and forces it downwardly allowing the plate to enter the side holding clips on the printing device frame.

Whenever the old printing plate in the frame is to be replaced by a newly embossed plate it is desirable to remove the information card corresponding to the old plate. This is accomplished by a spring plate 241, Figs. 15 and 16, fastened to the under side of the ejector bar and having sharp saw teeth on its free edge. When the ejector bar is lowered, as hereinbefore described, these teeth engage the information card B2 on the printing device frame and slide it endwise until it is removed from the printing device frame. In order to insure the release of the card from the right hand corner clip 208, the corner 242 of the card is kinked or crimped so that it will ride over the clip. This is accomplished by a spring actuated dog 243 pivoted on the end of the lower section of the ejector bar Figs. 16 and 18. Normally its end 244 is held downwardly at an angle by the spring 245, as shown in Fig. 16, in position to engage the end edge of the card. As the ejector bar is lowered the end 244 of the dog engages the printing device frame and causes the dog to be swung about its pivot. This imparts a lengthwise movement to the edge of the card and causes it to kink up at 242 as shown in Fig. 18.

The various movements of the ejector bar and feed bars are brought about in proper timed relation by mechanism driven from the main shaft 16. The vertical shaft 250, Fig. 2, is journaled in suitable bearings on the frame. This shaft has an arm 251 which is pivotally connected by means of the link 252 to the end of the ejector bar and serves to reciprocate this ejector bar. The overhanging frame has a slot provided for the movement of this pivotal connection. Another arm 253 is pivotally connected by means of the link 254 to the cross bar 216 of the feed bar mechanism and serves to operate said feed bar mechanism. This arm 253 is loose on the shaft 250 but it is operated by the shaft 250 through the medium of the short arm 255 and the spring 256 connected between the two arms 253 and 255. There is also another connection between the arms 253 and 255. This consists of a headed rod 253' fastened to arm 255 and extends loosely through a lug on arm 253. The head of the rod is spaced slightly from the lug and forms a lost motion connection between the arms 253 and 255. This is provided for two reasons. One reason is that in the event that the printing frames become gummy and stick in their feeding movement, the head will engage the lug and form a positive connection between the arms 253 and 255. The other reason is that this connection permits the printing plate mechanism to be stopped by the stop pin 222', Fig. 17, slightly in advance of the lowering of the ejector bar into engagement with the embossed plates as hereinbefore described. Another arm 257 fastened on the shaft has an elongated slot 258 in which the crank pin 259 on the horizontal disk 260 operates, forming a pin and slot driving connection between the disk and the arm, whereby the rotation of the disk will oscillate the shaft 250 and reciprocate the ejector bar and printing frame feed mechanisms. The disk 260 is mounted on a vertical shaft 261 in bearings on the frame. The shaft 261 is driven from a horizontal shaft 262, Fig. 10, through the beveled gears 263. Shaft 262 is driven from the main shaft 16 through a ratchet mechanism. The shaft 16 carries a pinion wich drives a larger gear 264 on shaft 265 journaled in bearings on the frame, and this gear 264 has a connecting rod 266, Figs. 2 and 11, one end of which has a crank connection with the gear 264. The connecting rod, Fig. 2a, has a long slot 267 through which the crank pin 268 on the gear extends. The connecting rod also has a beveled shoulder 269 against which a driving block 270 fits, the driving block also having a beveled shoulder positioned against the beveled shoulder 269 on the connecting rod. This block is yieldingly held in place by the compression spring 271 on the crank pin. The compression of the spring is sufficient to maintain a driving connection between the gear and connecting rod under normal conditions. However, if any abnormal condition arises the additional strain on the driving connection will cause the block to ride up on the connecting rod and allow said rod to slip relatively to the crank pin thus preventing the parts from being damaged.

The other end of the connecting rod is pivotally connected on the end of an arm 272 which is loose on the shaft 262, Figs. 11 and 15, but it carries a spring actuated pawl 273 adapted to engage the notches 274 of a ratchet wheel 275 fastened to said shaft, whereby the operation of the connecting rod rotates the shaft step by step. A cam member 276 is mounted loose on the shaft 262 adjacent the ratchet wheel. One end of this cam member has a cam 277 which is higher than the ratchet teeth. The other arm of the cam member has a pin 278 which is engaged by a trip latch 279 for normally holding the cam member against rotation. When thus held against rotation the cam portion 277 is positioned beneath the pawl 273 and prevents the pawl from engaging the ratchet wheel during its reciprocation, thereby preventing the rotation of the shaft 262. When the trip latch is operated to release the cam member it will rotate under the influence of spring 280, connected between itself and the ratchet wheel, coming to a stop against the pin 281. This removes the cam portion 277 from the pawl and permits the pawl to engage the ratchet teeth, thereby intermittently rotating the shaft 262 step by step and causing a cycle of operation of the ejector bar and feed mechanism. The cam member 276 rotates with the ratchet wheel until it completes one revolution, whereupon the pin 278 engages the trip lever 279 which stops the rotation of the cam member in position to again prevent the pawl from actuating the ratchet. The trip latch 279 is under the control of the operator. It is mounted on a control rod 282 and which extends forward to a convenient position beneath the plate carriage for the operator.

Its outer end has a downwardly turned handle for manipulation by the operator. The control rod also has an upstanding arm 285 positioned between limit stops 284 on the frame, and a spring 286 is connected between this arm and the frame to normally hold the trip lever 279 in position to be engaged by the pin 278 on the cam member.

The control rod is normally locked against operation for the purpose of preventing the operation of the ejector bar and plate feeding mechanism unless the newly embossed printing plate is in proper position on the bed 225. This is accomplished by a locking lever 290, Figs. 13, 13a and 14, which is pivoted at 291 on the machine frame. The lower end of this locking lever is normally held by the spring 292 in engagement with the upper end of an arm 293 on the control rod 282 to prevent the rotation of the control rod. This locking lever, however, is rotated about its pivot, to release the arm 293, by means of an arm 294 which is fastened to the line shift plate 183 and extends downwardly through a suitable slot 295 of the carriage frame 160. The lower end of this arm 294 engages the upper end of the locking lever 290 to operate said locking lever when the carriage is in proper position. The lower end of the arm 294 has a beveled face 296 for engagement with the locking lever 290 so that it will operate said locking lever regardless of whether the line shift plate is shifted by the operator after the carriage is brought into position or whether the carriage is brought to position with the line shift plate already shifted. The first mentioned of these two conditions may exist where the operator embossed only two lines of characters on the plate and then moves the plate carriage to the right. The operator must then shift the line shift plate one more line in order to properly align the printing plate on the ejector bed 225. The second of the above mentioned conditions exists where three lines have been embossed on the printing plate and the carriage shifted to the right. In this condition the printing plate will have been properly aligned with the ejector bar during the embossing operation.

I am aware that changes in the construction and arrangement of parts may be made without departing from the spirit of the invention and I reserve the right to make such changes as fall fairly within the scope of the appended claims.

I claim:

1. In a machine of the class described, the combination of mechanism for inserting embossed printing plates into a printing device frame, a magazine containing a stack of printing plate blanks to be embossed, a carriage movable between said magazine and inserting mechanism for carrying the blanks from the magazine to said inserting mechanism, means controlled by the carriage for extracting the blanks from the magazine, means operated by said inserting mechanism for removing printing plates from the carriage, and embossing mechanism intermediate the magazine and inserting mechanism for embossing the blank on the carriage.

2. In a machine of the class described, the combination of means for inserting embossed printing plates into printing device frames, feeding mechanism for feeding the frames to said inserting mechanism, a magazine containing a stack of printing plates to be embossed, embossing mechanism intermediate the magazine and said inserting mechanism, a carriage frame extending from the magazine to the inserting mechanism, a carriage movable along said carriage frame for carrying the blank from the magazine through the embossing to said inserting mechanism, means controlled by the carriage for automatically extracting a blank from the magazine, and means operated by the inserting mechanism for automatically removing the printing plate from the carriage.

3. In a machine of the class described, the combination of an inserting mechanism for inserting printing plates into printing device frames, a plate embossing mechanism, a magazine containing a stack of printing plate blanks, a carriage movable in a straight line relative to said embossing mechanism and inserting mechanism, means operated by the carriage for extracting a blank from the magazine in a direction lengthwise of said blank and parallel to the line of movement to the carriage, means operated by said inserting mechanism for removing the printing plate from the carriage in a direction lengthwise of the plate and parallel to the movement of the carriage, and feeding mechanism for positioning a printing device frame to receive the plate from the inserting mechanism in the same lengthwise movement of said plate.

4. In a machine of the class described, the combination of an inserting mechanism for inserting printing plates into printing device frames, a plate embossing mechanism, a magazine containing a stack of printing plate blanks, a carriage movable in a straight line relative to said embossing mechanism and inserting mechanism, means operated by the carriage for extracting a blank from the magazine in a direction lengthwise of said blank and parallel to the line of movement to the carriage, means operated by said inserting mechanism for removing the printing plate from the carriage in a direction lengthwise of the plate and parallel to the movement of the carriage, feeding mechanism for positioning a printing device frame to receive the plate from the inserting mechanism in the same lengthwise movement of said plate, and means for shifting the blank on the carriage in a direction transverse to the line of movement of the carriage for positioning the blank relative to the embossing mechanism.

5. In a machine of the class described, the combination of a printing plate embossing mechanism, a magazine containing a stack of printing plate blanks, a carriage movable relatively to the magazine and embossing mechanism, means on the carriage for gripping a blank, and means for projecting a blank from the magazine into the path of the gripping device for engagement by the gripping device.

6. In a machine of the class described, the combination of a printing plate embossing mechanism, a magazine containing a stack of printing plate blanks, means for transferring the blanks from the magazine to the embossing mechanism and comprising a carriage movable relatively to the magazine and embossing mechanism and having a gripping device for gripping the blank as the carriage is moved relatively to the magazine, and means for projecting a blank from the magazine into the path of the gripping means.

7. In a machine of the class described, the combination of a magazine containing a stack of rectangular printing plate blanks, a carriage movable relatively to the magazine in a direction parallel to the length of the blanks and having a gripping device for gripping the edge of a blank as the carriage moves, and means for projecting a blank from the magazine in a direction transversely of its length to position the edge of the blank in the path of the gripping device.

8. In a machine of the class described, the combination of a magazine containing a vertical stack of rectangular printing plate blanks, a carriage movable adjacent the magazine and parallel to a length of the blanks and having a gripping device for slidingly engaging a blank adjacent its edge as the carriage moves, and means for laterally offsetting the lowermost blank in the stack to position the blank in the path of the gripping device.

9. In a machine of the class described, the combination of a magazine containing a vertical stack of rectangular printing plate blanks, a carriage movable adjacent the magazine and parallel to a length of the blanks and having a gripping device for slidingly engaging a blank adjacent its edge as the carriage moves, and means controlled by the movement of the carriage for laterally offsetting the lowermost blank in the stack to position the blank for engagement by the gripping device.

10. In a machine of the class described, the combination of a magazine containing a vertical stack of rectangular printing plate blanks, a carriage movable adjacent the magazine and parallel to a length of the blanks and having a gripping device for slidingly engaging a blank adjacent its edge as the carriage moves, means for laterally offsetting the lowermost blank in the stack to position the blank for engagement by the gripping device, and a cam on the carriage for actuating said offsetting means in advance of the engagement of the gripping device with the blank.

11. In a machine of the class described, the combination of a printing device frame feeding mechanism for advancing frames to receiving position, means for positioning said frames in said receiving position, an embossing mechanism for embossing printing plates, a carriage for carrying the printing plates from embossing position to said receiving position, and means for transferring the embossed plate from the carriage to the frame in receiving position.

12. In a machine of the class described, the combination of a printing device frame feeding mechanism for advancing frames step-by-step to a receiving position and for discharging said frames from said receiving position, means for positioning said frames in said receiving position, an embossing mechanism for embossing a printing plate, a carriage for conveying the embossed plate from embossing position to the position in line with said receiving position, and a reciprocating mechanism for transferring the embossed plate in said line to the printing device frame.

13. In a machine of the class described, the combination of a printing plate embossing mechanism, a carriage for conveying the embossed plate from embossing position to a discharging position, means for discharging the embossed plate from the carriage, a printing device frame feeding mechanism for positioning a frame to receive the embossed plate discharged from the carriage, and means for positioning the discharged plate on said frame.

14. In a machine of the class described, the combination of a printing plate embossing mechanism, a carriage for moving the embossed plate from embossing position in a direction lengthwise of the plate, means for positioning a printing device frame in the line of movement of the embossed plate to receive said embossed plate and for moving said frame out of said line of movement and for positioning another frame in said line of movement after a plate has been transferred onto the first frame, and means for transferring the printing plate from the carriage to the printing frame positioned in said line of movement.

15. In a machine of the class described, the combination of a printing plate embossing mechanism, a feed mechanism for advancing to receiving position a printing device frame having a printing plate locked thereon, and means for unlocking and ejecting the locked printing plate from the frame and inserting in place thereof a newly embossed plate from the embossing mechanism.

16. In a machine of the class described, the combination of a printing device frame feeding mechanism for presenting in receiving position a printing device frame having a printing plate locked thereon, means for positioning a substitute printing plate adjacent the frame in receiving position, and means for unlocking the locked printing plate and ejecting it from the frame and inserting the substitute plate in the frame.

17. In a machine of the class described, the combination of a magazine for holding a stack of printing device frames having printing plates mounted thereon, feeding mechanism for moving a frame from the magazine to receiving position, means for ejecting printing plates from the frame while it is in receiving position, and means for inserting another printing plate in said frame in the place of the ejected plate.

18. In a machine of the class described, the combination of a feed mechanism for moving into receiving position a printing device frame having a printing plate locked thereon, a sliding ejector operable in said receiving position for engaging the locked printing plate and completely removing it from the frame, and means for releasing the plate to permit its removal by said ejecting means.

19. In a machine of the class described, the combination of a supporting bed, feed mechanism for moving a printing device frame onto said bed, means operated by said feed mechanism for positioning said frame on said bed, means for positioning a printing plate on the bed adjacent the frame, plate shifting mechanism for moving the printing plate from the bed to a position on the frame, and means for engaging the shifting mechanism with the printing plate.

20. In a machine of the class described, the combination of a supporting bed, feed mechanism for positioning on said bed a printing device frame having a printing plate locked thereon, means for positioning a printing plate on the bed adjacent the frame, an ejector mechanism movable relatively to the frame for ejecting the printing plate from the frame, means operable by the ejector mechanism for unlocking the printing plate on the frame, and means operable by said ejector mechanism for shifting the printing plate on the bed into position on the frame.

21. In a machine of the class described, the combination of a feed mechanism for placing in receiving position a printing device frame having a printing plate held thereon by a spring clip, a sliding ejector for completely removing the unreleased plate from the frame, and means operable by the ejector for detaching the spring clip from holding engagement to permit the removal of the plate.

22. In a machine of the class described, the combination of a feed mechanism for placing in printing position a printing device frame having a printing plate held thereon by a spring clip, an ejector mechanism for removing the plate from the frame, means operable by the ejector mechanism for detaching the spring clip from holding engagement to permit the removal of the plate, means for holding a printing plate in position adjacent the frame, and means on said ejector mechanism for engaging said adjacent plate and moving said plate into position on the frame in engagement with the spring clip.

23. In a machine of the class described, the combination of means for holding in position a printing device frame having a printing plate and an information card and having retaining means preventing the displacement of the printing plate and card, an ejector mechanism movable relatively to the frame for ejecting the plate and card from the frame, and means operable by the ejector mechanism for releasing the plate and card from the retaining means to permit the removal of the plate and card from the frame 24. In a machine of the class described, the combination of a supporting bed, a magazine containing a stack of printing device frames having printing plates thereon, feeding mechanism for moving a frame from the stack to the bed, a movable carriage having means for holding a printing plate on the bed in line with the printing plate on the frame, a reciprocating bar movable above both printing plates, and means operable by said bar for engagement with both plates to simultaneously eject the one printing plate from the frame and insert the other into position on the frame.

25. In a machine of the class described, the combination of a magazine for holding printing device frames in a stack, a supporting bed, feeding mechanism for moving a frame from the stack to the supporting bed, means operated by the feed mechanism for positioning a frame on said bed, and means for inserting a printing plate in said frame.

26. In a machine of the class described, the combination with means for holding a printing device frame having a printing plate removably locked thereon, and means for unlocking and ejecting said plate from the frame and at the same time inserting a new plate in the frame.

27. In a machine of the class described, the combination with means for holding a printing device frame having a printing plate removably locked thereon, and sliding means for unlocking the old plate and for simultaneously ejecting said old plate from the frame and inserting a new plate in the frame.

28. In a machine of the class described, the combination with means for holding a printing device frame having a printing plate removably locked thereon, and tandem ejector means including a portion operating to slide said plate from the frame and another portion operating at the same time to slide a new plate into the frame.

29. In a machine of the class described, the combination of a printing plate embossing mechanism, a magazine containing a stack of printing plate blanks, a carriage movable relative to the magazine and embossing mechanism, means for ejecting a blank from the magazine into the path of a gripping device on the carriage, and a gripping device on said carriage including a portion adapted to score the ejected blank as said gripping device is moved into engagement therewith whereby said blank will be firmly retained by said gripping device.

30. In a machine of the class described, the combination of a printing plate embossing mechanism, a magazine containing a stack of printing plate blanks, a carriage movable relative to the magazine and embossing mechanism, means on the carriage for gripping a blank, means for ejecting a blank from the magazine into the path of the gripping means for engagement by said gripping means, and means on the gripping means for scoring a slight groove in the face of the blank as the gripping means slides over the blank whereby the blank will be firmly retained by the gripping means.

31. In a machine of the class described, the combination of a magazine containing a stack of printing plate blanks, means for ejecting a blank from the magazine into the path of a gripping device, and a gripping device adapted for engagement with the ejected blank and including a portion for scoring a slight groove in the blank as the gripping device is slid thereover whereby said blank will be firmly retained by said gripping device.

CECIL C. McCAIN.